US010402473B2

(12) United States Patent
Salisbury

(10) Patent No.: US 10,402,473 B2
(45) Date of Patent: Sep. 3, 2019

(54) COMPARING, AND GENERATING REVISION MARKINGS WITH RESPECT TO, AN ARBITRARY NUMBER OF TEXT SEGMENTS

(71) Applicant: Richard Salisbury, Austin, TX (US)

(72) Inventor: Richard Salisbury, Austin, TX (US)

( * ) Notice: Subject to any disclaimer, the term of this patent is extended or adjusted under 35 U.S.C. 154(b) by 0 days.

(21) Appl. No.: 15/784,157

(22) Filed: Oct. 15, 2017

(65) Prior Publication Data

US 2018/0107633 A1    Apr. 19, 2018

Related U.S. Application Data

(60) Provisional application No. 62/408,804, filed on Oct. 16, 2016.

(51) Int. Cl.
*G06F 17/22*    (2006.01)
*G06F 17/24*    (2006.01)
*G06F 17/21*    (2006.01)

(52) U.S. Cl.
CPC ........ *G06F 17/2211* (2013.01); *G06F 17/218* (2013.01); *G06F 17/24* (2013.01)

(58) Field of Classification Search
CPC ..... G06F 17/2211; G06F 17/218; G06F 17/24
See application file for complete search history.

(56) References Cited

U.S. PATENT DOCUMENTS

| | | | | |
|---|---|---|---|---|
| 5,806,021 A * | 9/1998 | Chen | ...................... | G06F 17/277 704/1 |
| 6,052,657 A * | 4/2000 | Yamron | ................ | G06F 16/313 704/9 |
| 6,411,962 B1 * | 6/2002 | Kupiec | ............. | G06F 17/30616 |
| 6,537,325 B1 * | 3/2003 | Nishizawa | ............ | G06F 16/345 715/267 |
| 6,810,375 B1 * | 10/2004 | Ejerhed | ................. | G06F 17/271 704/2 |
| 7,113,897 B2 * | 9/2006 | Shimizu | .............. | G06F 17/2241 703/2 |
| 7,200,802 B2 * | 4/2007 | Kawatani | .......... | G06F 17/30011 707/E17.008 |
| 7,254,587 B2 * | 8/2007 | Lee | .................... | G06F 17/30997 |
| 7,260,773 B2 * | 8/2007 | Zernik | ................ | G06F 17/2211 707/999.202 |

(Continued)

*Primary Examiner* — Maikhanh Nguyen
(74) *Attorney, Agent, or Firm* — Dodd Call Black, PLLC; Dustin L. Call

(57) ABSTRACT

A system for comparing, and generating pairwise revision markings with respect to, an original text segment and a revised text segment that can include identifying pairwise unchanged text, marking the pairwise unchanged text in the revised text segment with a distinct visual style that signifies its status as such, attempting to successively identify pairwise text divergence points and pairwise text convergence points within the original text segment and the revised text segment, and taking further steps with respect to text that occurs between a pairwise text divergence point and a pairwise text convergence point and/or after a pairwise text divergence point (which steps can include copying text from the original text segment into the revised text segment and marking the copied text, if any, with a distinct visual style that signifies such text as either deleted text or inserted text, as applicable).

3 Claims, 10 Drawing Sheets

(56) References Cited

U.S. PATENT DOCUMENTS

| | | | | |
|---|---|---|---|---|
| 7,430,504 | B2* | 9/2008 | Vanderwende | G06F 16/367 |
| | | | | 704/9 |
| 8,196,030 | B1* | 6/2012 | Wang | G06K 9/00442 |
| | | | | 345/581 |
| 8,359,533 | B2* | 1/2013 | Dexter | G06F 17/24 |
| | | | | 715/200 |
| 8,977,538 | B2* | 3/2015 | Salisbury | G06F 17/2705 |
| | | | | 704/9 |
| 2003/0081811 | A1* | 5/2003 | Shimizu | G06F 17/2241 |
| | | | | 382/100 |
| 2003/0145278 | A1* | 7/2003 | Nielsen | G06F 17/2211 |
| | | | | 715/255 |
| 2004/0117734 | A1* | 6/2004 | Krickhahn | G06F 17/2229 |
| | | | | 715/234 |
| 2005/0010863 | A1* | 1/2005 | Zernik | G06F 17/2211 |
| | | | | 715/229 |
| 2012/0065959 | A1* | 3/2012 | Salisbury | G06F 17/2705 |
| | | | | 704/9 |

* cited by examiner

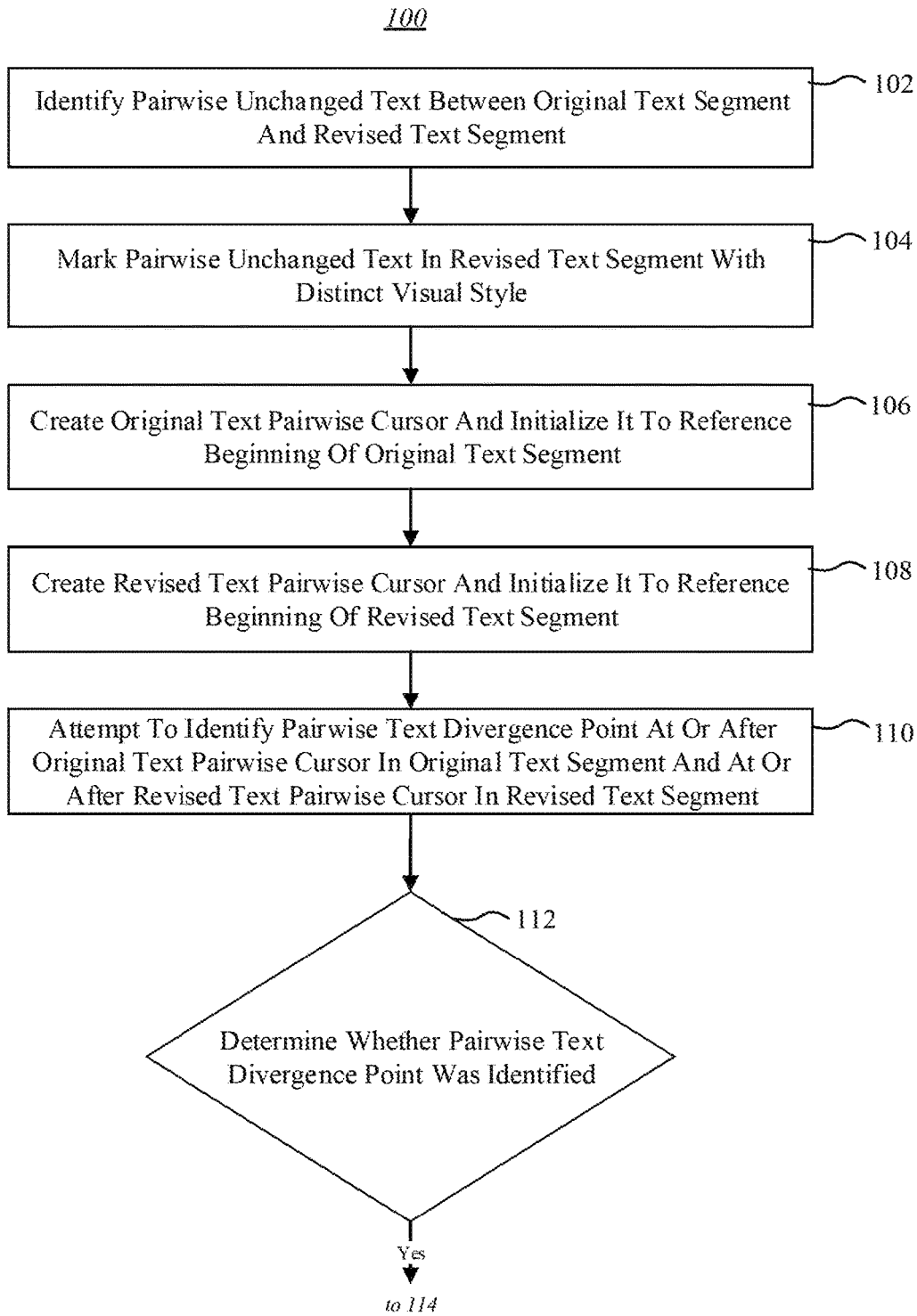
FIG. 1 (continued on next page)

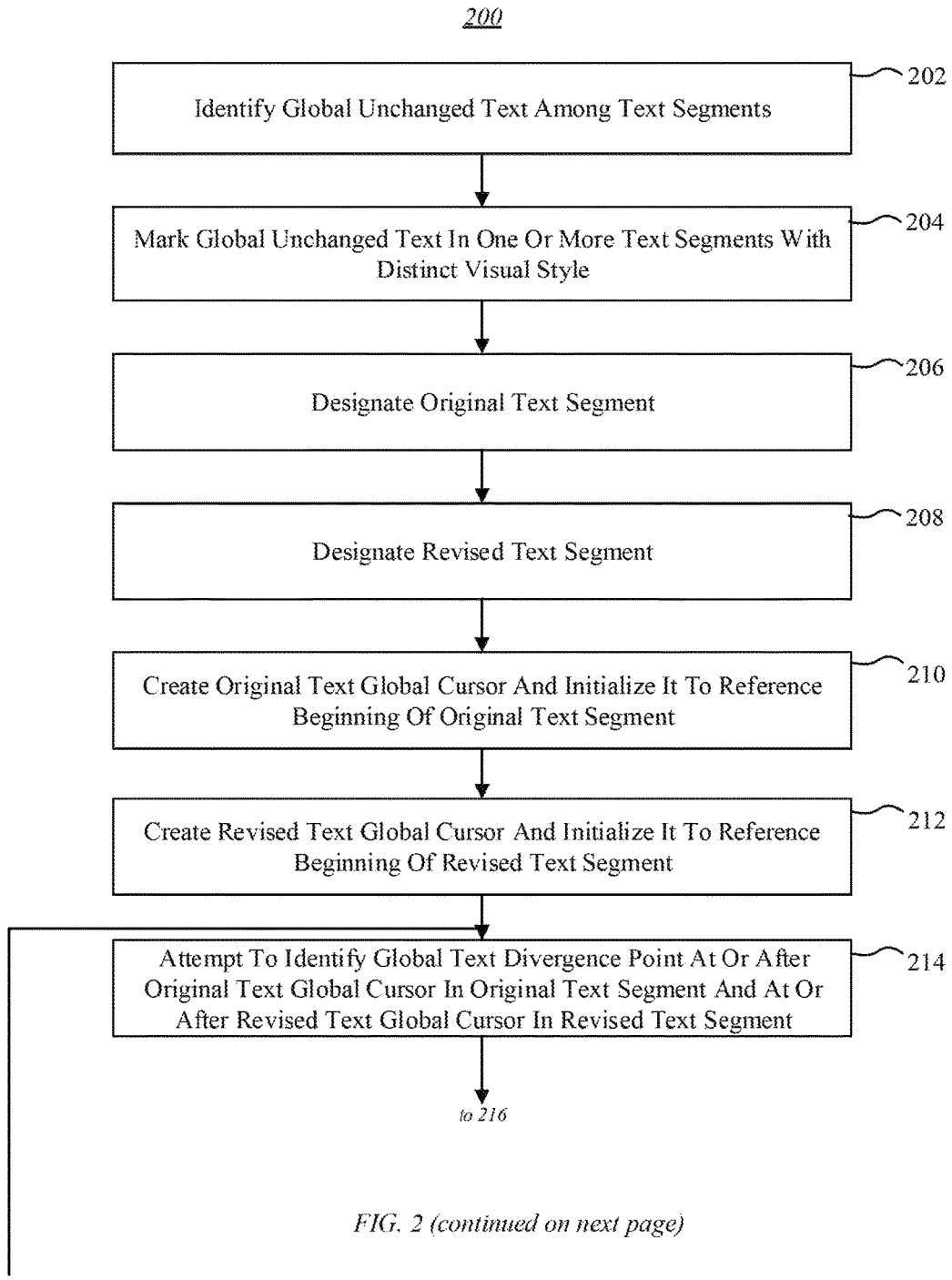
FIG. 2 (continued on next page)

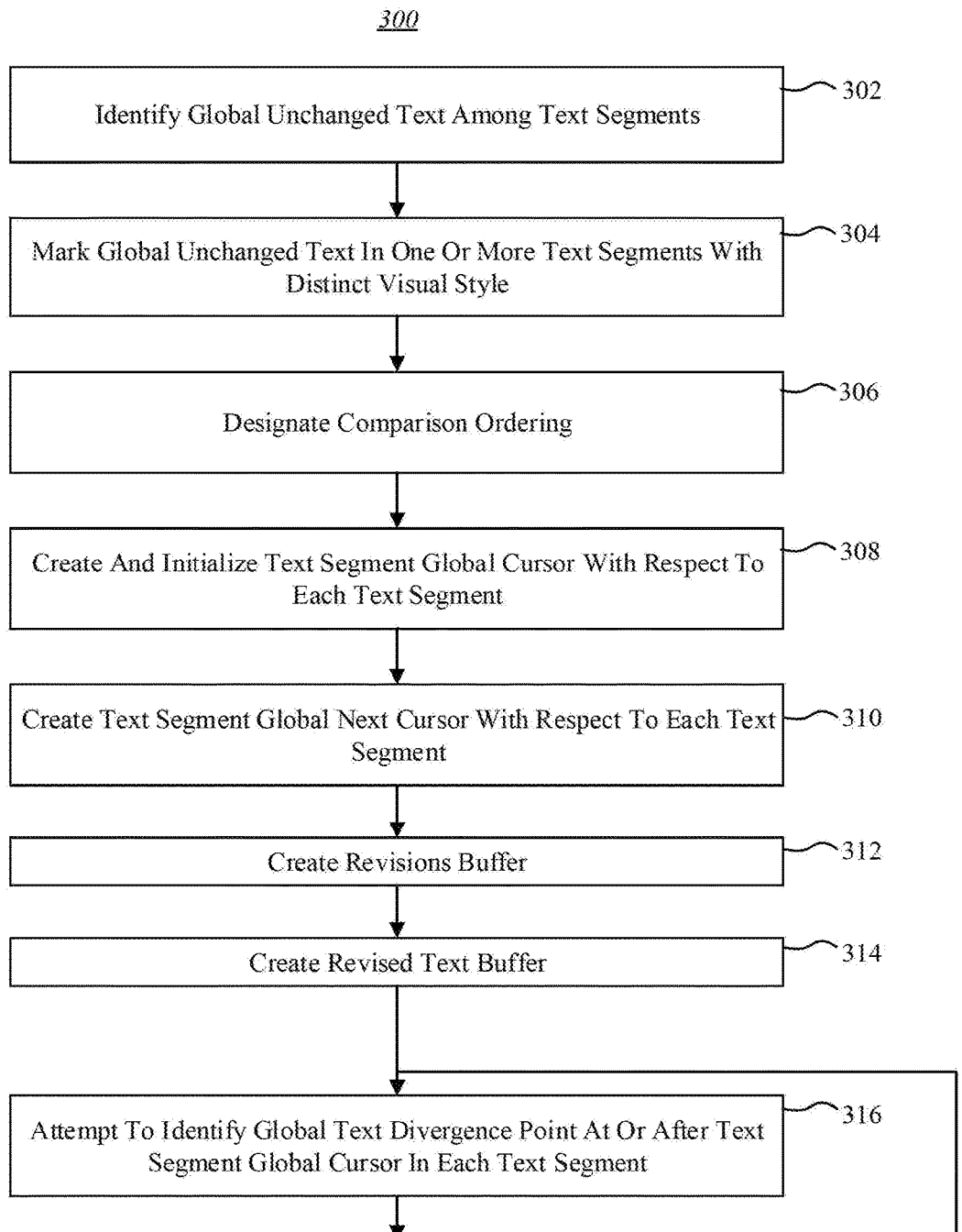
FIG. 3 (continued on next page)

COMPARING, AND GENERATING REVISION MARKINGS WITH RESPECT TO, AN ARBITRARY NUMBER OF TEXT SEGMENTS

CROSS-REFERENCE TO RELATED APPLICATIONS

This application claims the benefit of and priority to U.S. Provisional Patent Application Ser. No. 62/408,804 filed on Oct. 16, 2016, which application is incorporated herein by reference in its entirety.

BACKGROUND OF THE INVENTION

Means for automated comparison of two texts are well known in the art and widely used. These include, for example, means for comparing an original document and a revised document and visually marking text that changes between them. For the case of two documents, this may be accomplished with two visual styles: one for text in the original document that does not appear in the revised document (i.e. deleted text) and one for text in the revised document that does not appear in the original document (i.e. inserted text). Text that does not change from the original document to the revised document need not be separately marked.

For example, consider the following documents:

| Document 1 | Document 2 |
|---|---|
| Our story starts on a dark and stormy night many years ago, in an unremarkable house on an unremarkable street in an unremarkable city. | Our tale begins on a dark and stormy night not many years ago, in a nondescript house on an average street in an unremarkable city. |

Assuming that Document 1 is the original document and Document 2 is the revised document, changed text might be marked with a visual style in which strikethrough signifies text from Document 1 that was deleted in Document 2, underline signifies text not contained in Document 1 that has been inserted into Document 2 and text unchanged between Document 1 and Document 2 is not marked. The results could be depicted as follows:

| Document 1 | Document 2 |
|---|---|
| Our story starts on a dark and stormy night many years ago, in an unremarkable house on an unremarkable street in an unremarkable city. | Our ~~story starts~~ tale begins on a dark and stormy night not many years ago, in ~~an unremarkable~~ a nondescript house on an ~~unremarkable~~ average street in an unremarkable city. |

Such pairwise document comparison systems (comprising means for comparing an original and a revised document and visually marking the results) are widely used. However, performing simultaneous comparison and visual marking of revisions with respect to more than two documents is more complicated.

As already noted, all changes between an original and a revised document may be reflected with only two visual marking styles: one for deleted text and one for inserted text. Reflecting changes between and among more than two documents requires an augmented system of visual marking because of a larger number of possibilities. In the case of three documents, for example, there are at least the following possibilities: i) text may be the same in all three documents; ii) text may be the same in Document 1 and Document 2, but not Document 3; iii) text may be the same in Document 1 and Document 3, but not Document 2; iv) text may be the same in Document 2 and Document 3, but not Document 1; v) text may differ in all three documents. Furthermore, possibilities (ii)-(v) each embed further permutations in the form of deletions, insertions or some combination thereof. Accordingly, a need has arisen for means for comparing, and generating revision markings with respect to, an arbitrary number of text segments.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method of comparing, and generating pairwise revision markings with respect to, an original text segment and a revised text segment. The method can include identifying pairwise unchanged text between the original text segment and the revised text segment. The method can also include marking the pairwise unchanged text in the revised text segment with a distinct visual style that signifies its status as such. The method can also include creating an original text pairwise cursor and initializing it to reference the beginning of the original text segment. The method can also include creating a revised text pairwise cursor and initializing it to reference the beginning of the revised text segment. The method can also include attempting to identify the first-occurring instance of a pairwise text divergence point at or after the position in the original text segment referenced by the current value of the original text pairwise cursor and at or after the position in the revised text segment referenced by the current value of the revised text pairwise cursor. The method can also include determining whether a pairwise text divergence point was identified. The method can also include attempting to identify the first-occurring instance of a pairwise text convergence point at or after the pairwise text divergence point in the original text segment and at or after the pairwise text divergence point in the revised text segment when a pairwise text divergence point was identified. The method can also include determining whether a pairwise text convergence point was identified. The method can also include copying the text, if any, that occurs in the original text segment at or after the pairwise text divergence point and before the pairwise text convergence point, inserting the copied text, if any, into the revised text segment at the position that is immediately before the pairwise text divergence point in the revised text segment and marking the copied text, if any, with a distinct visual style that signifies such text as deleted text when a pairwise text convergence point was identified. The method can also include marking the text, if any, that occurs in the revised text segment at or after the pairwise text divergence point and before the pairwise text convergence point with a distinct visual style that signifies such text as inserted text. The method can also include adjusting the original text pairwise cursor so that it references the position of the pairwise text convergence point in the original text segment. The method can also include adjusting the revised text pairwise cursor so that it references the position of the pairwise text convergence point in the revised text segment. The method can also include copying the text, if any, that occurs in the original text segment at or after the pairwise text divergence point and before the end of the original text segment, inserting the copied text, if any, into the revised text segment at the position that is immediately before the pairwise text divergence point in the revised text segment and marking the copied text, if any, with a distinct visual style that signifies such text as deleted text when no pairwise text convergence point was identified. The method can also include marking the text, if any, that occurs in the revised text segment at or after the pairwise text divergence point and before the end of the revised text segment with a distinct visual style that signifies such text as inserted text.

Another example embodiment includes a method of comparing, and generating revision markings with respect to, two or more text segments. The method can include identifying global unchanged text among the text segments. The method can also include marking the global unchanged text in one or more of the text segments with a distinct visual style that signifies its status as such. The method can also include designating one of the text segments as the original text segment. The method can also include designating one of the text segments other than the original text segment as the revised text segment. The method can also include creating an original text global cursor and initializing it to reference the beginning of the original text segment. The method can also include creating a revised text global cursor and initializing it to reference the beginning of the revised text segment. The method can also include attempting to identify the first-occurring instance of a global text divergence point at or after the position in the original text segment referenced by the current value of the original text global cursor and at or after the position in the revised text segment referenced by the current value of the revised text global cursor. The method can also include determining whether a global text divergence point was identified. The method can also include attempting to identify the first-occurring instance of a global text convergence point at or after the global text divergence point in the original text segment and at or after the global text divergence point in the revised text segment. The method can also include determining whether a global text convergence point was identified. The method can also include comparing, and generating pairwise revision markings with respect to, the text, if any, in the original text segment that occurs at or after the global text divergence point and before the global text convergence point and the text, if any, in the revised text segment that occurs at or after the global text divergence point and before the global text convergence point when a global text convergence point was identified. The method can also include adjusting the original text global cursor so that it references the position of the global text convergence point in the original text segment. The method can also include adjusting the revised text global cursor so that it references the position of the global text convergence point in the revised text segment. The method can also include comparing, and generating pairwise revision markings with respect to, the text, if any, in the original text segment that occurs at or after the global text divergence point and before the end of the original text segment and the text, if any, in the revised text segment that occurs at or after the global text divergence point and before the end of the revised text segment when no global text convergence point was identified.

Another example embodiment includes a method of comparing, and generating revision markings with respect to, two or more text segments using a comparison ordering. The method can include identifying global unchanged text among the text segments. The method can also include marking the global unchanged text in one or more of the text segments with a distinct visual style that signifies its status as such. The method can also include designating a comparison ordering among the text segments. The method can also include creating a text segment global cursor associated with each text segment and initializing each to reference the beginning of the text segment that the text segment global cursor is associated with. The method can also include creating a text segment global next cursor associated with each text segment. The method can also include creating a revisions buffer. The method can also include creating a revised text buffer. The method can also include attempting to identify the first-occurring instance of a global text divergence point at or after the position in each text segment referenced by the current value of the text segment global cursor associated with the text segment. The method can also include determining whether a global text divergence point was identified. The method can also include attempting to identify the first-occurring instance of a global text convergence point at or after the global text divergence point in each text segment when a global text divergence point was identified. The method can also include determining whether a global text convergence point was identified. The method can also include adjusting each text segment global next cursor to reference the position of the global text convergence point in the text segment that the text segment global next cursor is associated with when a global text convergence point was identified. The method can also include adjusting each text segment global next cursor to reference the end of the text segment that the text segment global next cursor is associated with when no global text convergence point was identified. The method can also include creating an original text segment counter and initializing it to reference the first text segment among the text segments according to the designated comparison ordering. The method can also include designating the text segment referenced by the current value of the original text segment counter as the original text segment. The method can also include determining whether a text segment exists that is immediately after the original text segment according to the designated comparison ordering. The method can also include designating the text segment that is immediately after the original text segment according to the designated comparison ordering as the revised text segment when a text segment exists that is immediately after the original text segment according to the designated comparison ordering. The method can also include emptying the revised text buffer. The method can also include copying the text, if any, that occurs in the revised text segment at or after the global text divergence point and before the position referenced by the current value of the global text segment next cursor associated with the revised text segment into the revised text buffer. The method can also include comparing, and generating pairwise revision markings with respect to, the text, if any, in the original text segment that occurs at or after the global text divergence point and before the position referenced by the current value of the global text segment next cursor associated with the original text segment and the text contained in the revised text buffer. The method can also include copying the contents of the revised text buffer into the revisions buffer. The method can also include adjusting the original text segment counter so that it references the revised text segment. The method can also include adjusting each text segment global cursor so that its value is equal to the current value of the global text segment next cursor that is associated with the same text segment when no text segment exists that is immediately after the original text segment according to the designated comparison ordering.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
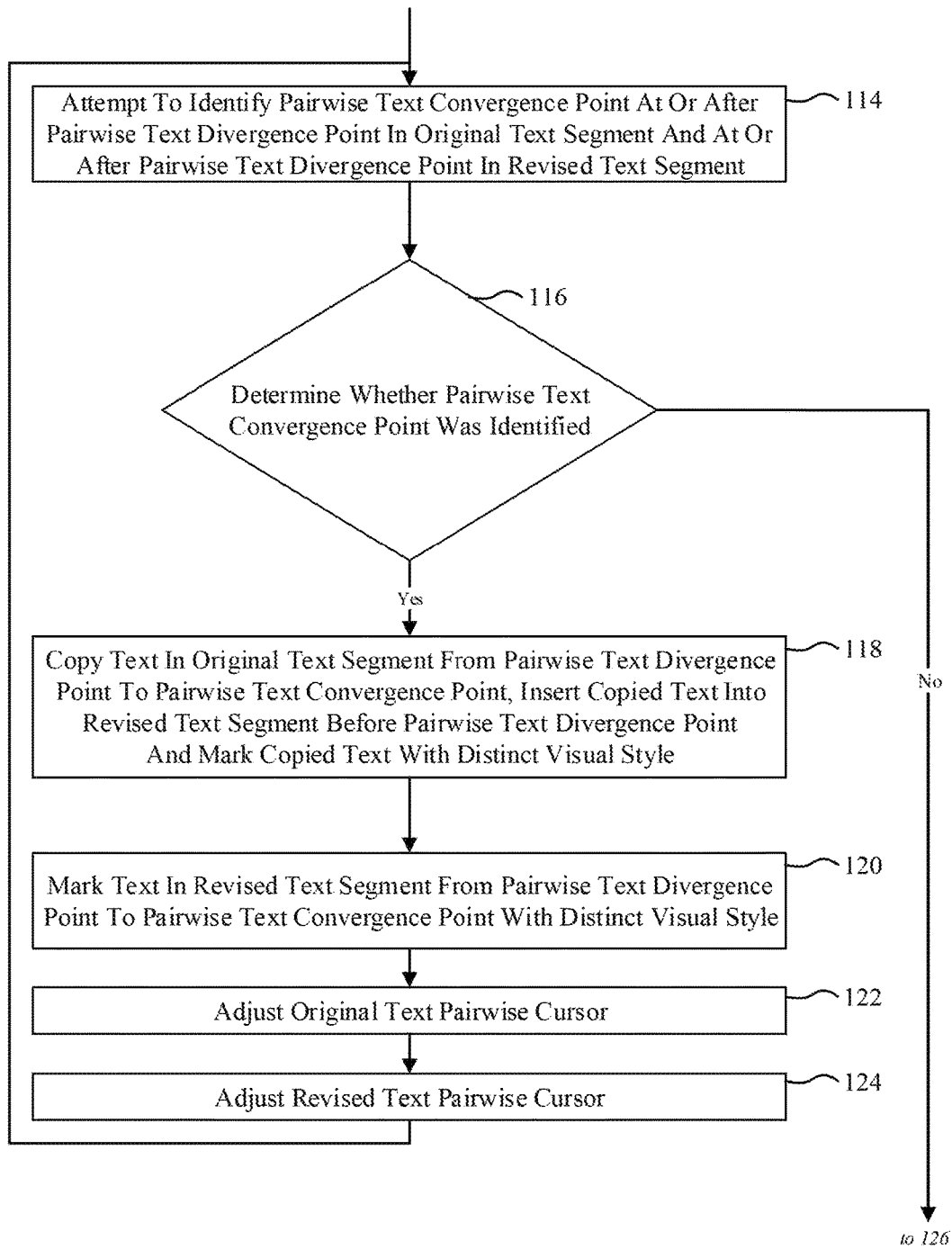
FIG. 1 is a flowchart illustrating a method of comparing, and generating pairwise revision markings with respect to, an original text segment and a revised text segment.
Figure 1:
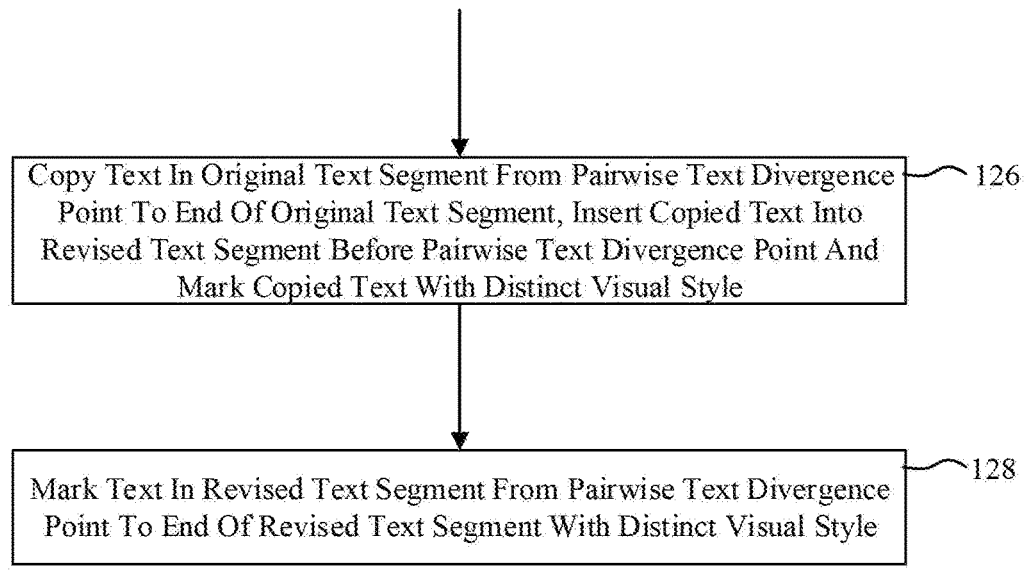

FIG. 1 is a flowchart illustrating a method 100 of comparing, and generating pairwise revision markings with respect to, an original text segment and a revised text segment. A "text segment" means any document or other sequence of text, either complete in itself or excerpted from a larger document or other sequence of text.

FIG. 1 shows that the method 100 can include identifying 102 pairwise unchanged text between the original text segment and the revised text segment. With respect to two text segments, "pairwise unchanged text" means text that is the same in each text segment.

FIG. 1 shows that the method 100 can also include marking 104 the pairwise unchanged text in the revised text segment with a distinct visual style that signifies its status as such. To "mark" text means to use any combination of computer hardware and/or software to display the text for the benefit of a user in such a manner that the marked text is visually differentiated from other text. A "visual style" means any system or format by which text can be marked and includes different combinations of fonts, typefaces, text effects and text colors.

FIG. 1 shows that the method 100 can also include creating 106 a text pointer (the "original text pairwise cursor") and initializing it to reference the beginning of the original text segment. A "text pointer" means any form or combination of computer storage capable of storing a reference to a specific position within a text segment, including by means of offset, pointer or index. A "position" within a text segment means the location of particular text (which can include an individual word, character or other constituent part of the text segment) within the text segment.

FIG. 1 shows that the method 100 can also include creating 108 a text pointer (the "revised text pairwise cursor") and initializing it to reference the beginning of the revised text segment.

FIG. 1 shows that the method 100 can also include attempting 110 to identify the first-occurring instance of a pairwise text divergence point at or after the position in the original text segment referenced by the current value of the original text pairwise cursor and at or after the position in the revised text segment referenced by the current value of the revised text pairwise cursor. With respect to two text segments, a "pairwise text divergence point" means an instance in either (or both) of the text segments of text that is not pairwise unchanged text.

In the following text segments, for example, the first pairwise text divergence point is marked with a caret (^) symbol:

| Text Segment 1 | Text Segment 2 |
|---|---|
| Our ^story starts on a dark and stormy night many years ago, in an unremarkable house on an unremarkable street in an unremarkable city. | Our ^tale begins on a dark and stormy night many years ago, in an unremarkable house on an unremarkable street in an unremarkable city. |

The first pairwise text divergence point is also marked in the following example text segments:

| Text Segment 1 | Text Segment 2 |
|---|---|
| Our ^tale begins on a dark and stormy night many years ago, in an unremarkable house on an unremarkable street in an unremarkable city. | Our ^curious tale begins on a dark and stormy night many years ago, in an unremarkable house on an unremarkable street in an unremarkable city. |

In both of the prior examples, the pairwise text divergence point in both Text Segment 1 and Text Segment 2 is the position immediately after "Our" in each text segment. This is true of Text Segment 1 in the second example even though it does not contain any text that is not pairwise unchanged text. Because Text Segment 2 contains text after the word "Our" that is not pairwise unchanged text, the corresponding position in Text Segment 1 constitutes a pairwise text divergence point in that text segment.

When one or both of the text segments begin with text that is not pairwise unchanged text, the first pairwise text divergence point is the beginning position of each text segment. Such is the case with the following example text segments:

| Text Segment 1 | Text Segment 2 |
|---|---|
| ^Our story starts on a dark and stormy night many years ago, in an unremarkable house on an unremarkable street in an unremarkable city. | ^This story starts on a dark and stormy night many years ago, in an unremarkable house on an unremarkable street in an unremarkable city. |

FIG. 1 shows that the method 100 can also include determining 112 whether a pairwise text divergence point was identified.

FIG. 1 shows that the method 100 can also include attempting 114 to identify the first-occurring instance of a pairwise text convergence point at or after the pairwise text divergence point in the original text segment and at or after the pairwise text divergence point in the revised text segment when a pairwise text divergence point was identified. With respect to two text segments, a "pairwise text convergence point" means an instance of text that is pairwise unchanged text in each text segment.

FIG. 1 shows that the method 100 can also include determining 116 whether a pairwise text convergence point was identified.

FIG. 1 shows that the method 100 can also include copying 118 the text, if any, that occurs in the original text segment at or after the pairwise text divergence point and before the pairwise text convergence point, inserting the copied text, if any, into the revised text segment at the position that is immediately before the pairwise text divergence point in the revised text segment and marking the copied text, if any, with a distinct visual style that signifies such text as deleted text when a pairwise text convergence point was identified. To "copy" text means to use any form or combination of computer storage to store an identical copy of the text.

FIG. 1 shows that the method 100 can also include marking 120 the text, if any, that occurs in the revised text segment at or after the pairwise text divergence point and before the pairwise text convergence point with a distinct visual style that signifies such text as inserted text.

FIG. 1 shows that the method 100 can also include adjusting 122 the original text pairwise cursor so that it references the position of the pairwise text convergence point in the original text segment.

FIG. 1 shows that the method 100 can also include adjusting 124 the revised text pairwise cursor so that it references the position of the pairwise text convergence point in the revised text segment.

FIG. 1 shows that the method 100 can also include copying 126 the text, if any, that occurs in the original text segment at or after the pairwise text divergence point and before the end of the original text segment, inserting the copied text, if any, into the revised text segment at the position that is immediately before the pairwise text divergence point in the revised text segment and marking the copied text, if any, with a distinct visual style that signifies such text as deleted text when no pairwise text convergence point was identified.

FIG. 1 shows that the method 100 can also include marking 128 the text, if any, that occurs in the revised text segment at or after the pairwise text divergence point and before the end of the revised text segment with a distinct visual style that signifies such text as inserted text.

The following example is provided for illustrative purposes only and without intent or effect to limit the scope of the invention. It does not purport to illustrate all of the steps (either required or optional) nor every sub-part of, nor every state nor condition applicable to, those steps (either required or optional) illustrated.

Assume an original text segment and a revised text segment as follows:

| Original Text Segment | Revised Text Segment |
| --- | --- |
| Our story starts on a dark and stormy night many years ago. | Our tale commences on a dark and stormy night not many years past. |

After the pairwise unchanged text has been identified 102 and marked 104 in the revised text segment (using italics for purposes of this example), the text segments might now be depicted as follows:

| Original Text Segment | Revised Text Segment |
| --- | --- |
| Our story starts on a dark and stormy night many years ago. | *Our* tale commences *on a dark and stormy night* not *many years* past. |

At 110, a pairwise text divergence point is identified at "story" in the original text segment and at "tale" in the revised text segment. Because it is determined 112 that a pairwise text divergence point was identified, an attempt 114 is made to identify a subsequently-occurring pairwise text convergence point. The attempt succeeds and a pairwise text convergence point is identified at "on" in each text segment. Because it is determined 116 that a pairwise text convergence point was identified, the text occurring in the original text segment at or after "story" and before "on" is copied 118, inserted into the revised text segment at the position immediately before "tale" and marked (using strikethrough for purposes of this example). The text segments might now be depicted as follows:

| Original Text Segment | Revised Text Segment |
| --- | --- |
| Our story starts on a dark and stormy night many years ago. | Our ~~story starts~~ tale commences *on a dark and stormy night* not *many years* past. |

The text occurring in the revised text segment at or after "tale" and before "on" is then marked 120 (using underline for purposes of this example). The text segments might now be depicted as follows:

| Original Text Segment | Revised Text Segment |
| --- | --- |
| Our story starts on a dark and stormy night many years ago. | Our ~~story starts~~ <u>tale commences</u> *on a dark and stormy night* not *many years* past. |

The original text pairwise cursor is adjusted 122 so that it references the position of "on" in the original text segment. The revised text pairwise cursor is adjusted 124 so that it references the position of "on" in the revised text segment.

At the next iteration of 110, a pairwise text divergence point is identified immediately after "night" in both the original text segment and the revised text segment. Although the subsequent text in the original text segment ("many") is pairwise unchanged text, the corresponding text in the revised text segment ("not") is not. Consequently, the position immediately after "night" is a pairwise text divergence point in each text segment.

Because it is determined 112 that a pairwise text divergence point was identified, an attempt 114 is made to identify a subsequently-occurring pairwise text convergence point. The attempt succeeds and a pairwise text convergence point is identified at "many" in each text segment. However, no text does (or can) occur in the original text segment both at or after "many" and before "many." Therefore, no text from the original text segment is copied 118.

The text occurring in the revised text segment at or after "not" and before "many" is marked 120 (using underline for purposes of this example). The text segments might now be depicted as follows:

| Original Text Segment | Revised Text Segment |
|---|---|
| Our story starts on a dark and stormy night many years ago. | Our ~~story starts~~ tale commences on a dark and stormy night not many years past. |

At the next iteration of 110, a pairwise text divergence point is identified at "ago" in the original text segment and at "past" in the revised text segment. Because it is determined 112 that a pairwise text divergence point was identified, an attempt 114 is made to identify a subsequently-occurring pairwise text convergence point. Because it is determined 116 that no pairwise text convergence point was identified, the text occurring in the original text segment at or after "ago" and before the end of the original text segment is copied 126, inserted into the revised text segment at the position immediately before "past" and marked (using strikethrough for purposes of this example). The text segments might now be depicted as follows:

| Original Text Segment | Revised Text Segment |
|---|---|
| Our story starts on a dark and stormy night many years ago. | Our ~~story starts~~ tale commences on a dark and stormy night not many years ~~ago~~ past. |

The text occurring in the revised text segment at or after "past" and before the end of the revised text segment is marked 128 (using underline for purposes of this example). The text segments might now be depicted as follows:

| Original Text Segment | Revised Text Segment |
|---|---|
| Our story starts on a dark and stormy night many years ago. | Our ~~story starts~~ tale commences on a dark and stormy night not many years ~~ago~~ past. |

Because it was determined 116 that no pairwise text convergence point was identified, further processing thereafter ceases.

Figure 2:
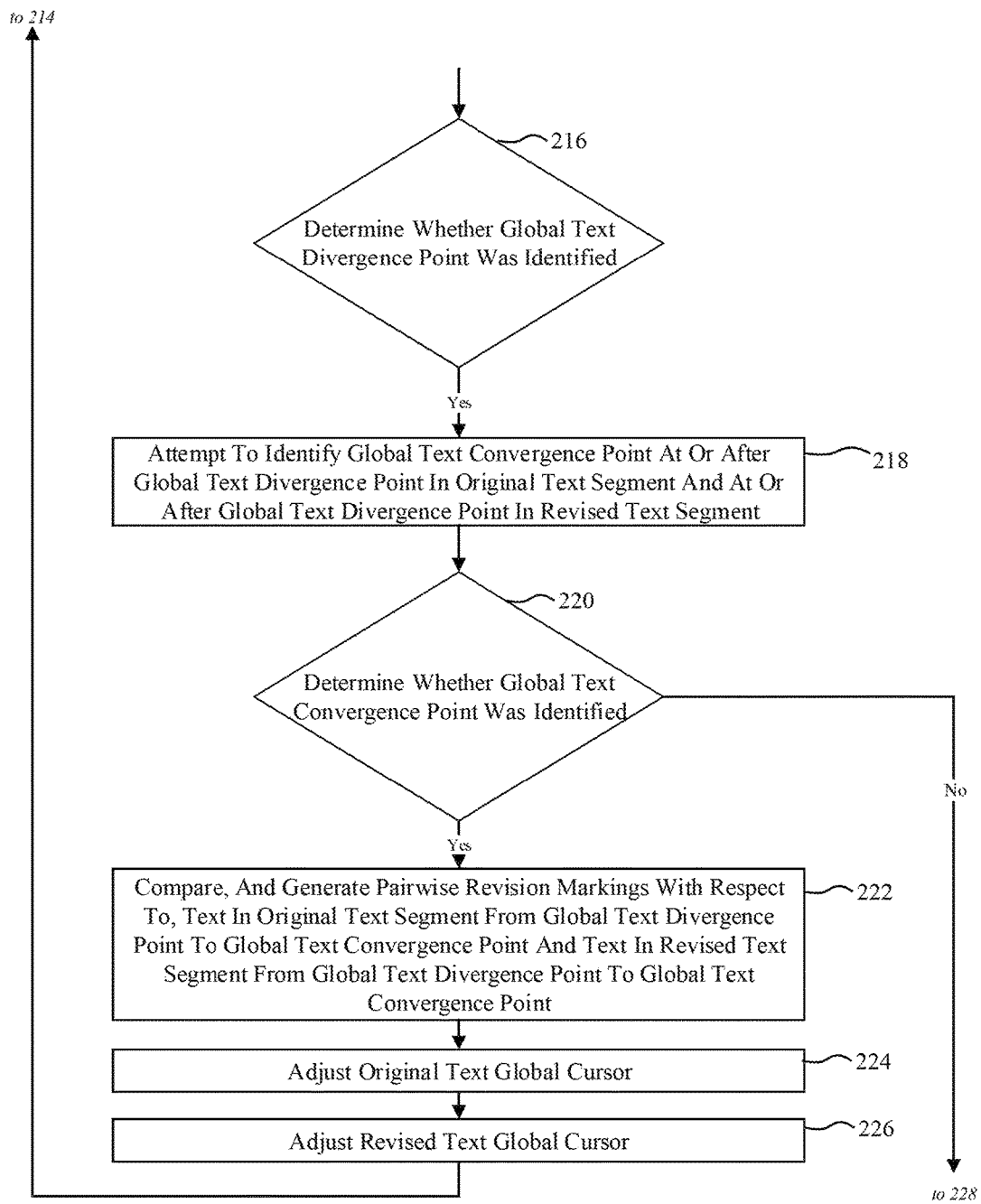
FIG. 2 is a flowchart illustrating a method of comparing, and generating revision markings with respect to, two or more text segments.
Figure 2:
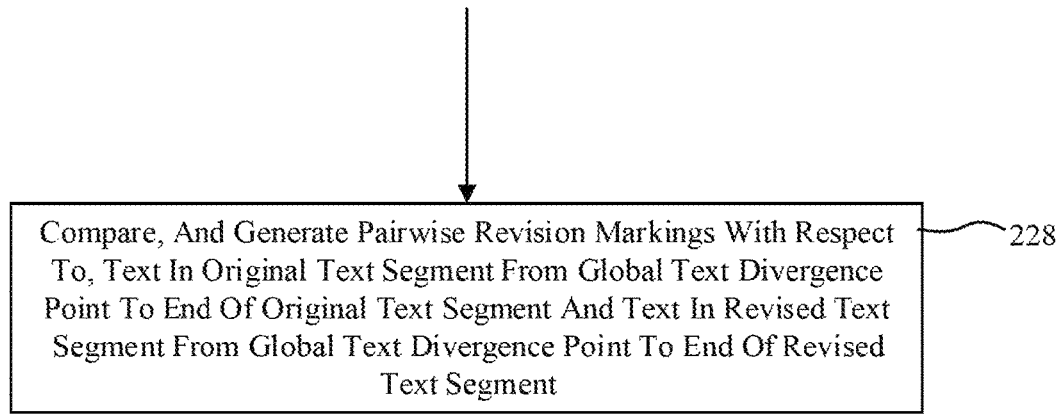

FIG. 2 is a flowchart illustrating a method 200 of comparing, and generating revision markings with respect to, two or more text segments.

FIG. 2 shows that the method 200 can include identifying 202 global unchanged text among the text segments. With respect to two or more text segments, "global unchanged text" means text that is the same in each of the text segments.

FIG. 2 shows that the method 200 can also include marking 204 the global unchanged text in one or more of the text segments with a distinct visual style that signifies its status as such.

FIG. 2 shows that the method 200 can also include designating 206 one of the text segments as the original text segment.

FIG. 2 shows that the method 200 can also include designating 208 one of the text segments other than the original text segment as the revised text segment.

FIG. 2 shows that the method 200 can also include creating 210 a text pointer (the "original text global cursor") and initializing it to reference the beginning of the original text segment.

FIG. 2 shows that the method 200 can also include creating 212 a text pointer (the "revised text global cursor") and initializing it to reference the beginning of the revised text segment.

FIG. 2 shows that the method 200 can also include attempting 214 to identify the first-occurring instance of a global text divergence point at or after the position in the original text segment referenced by the current value of the original text global cursor and at or after the position in the revised text segment referenced by the current value of the revised text global cursor. With respect to two or more text segments, a "global text divergence point" means an instance in one or more of the text segments of text that is not global unchanged text.

In the following text segments, for example, the first global text divergence point is marked with a caret (^) symbol.

| Text Segment 1 | Text Segment 2 | Text Segment 3 |
|---|---|---|
| Our ^story starts on a dark and stormy night many years ago, in an unremarkable house on an unremarkable street in an unremarkable city. | Our ^tale begins on a dark and stormy night many years ago, in an unremarkable house on an unremarkable street in an unremarkable city. | Our ^curious tale begins on a dark and stormy night many years ago, in an unremarkable house on an unremarkable street in an unremarkable city. |

The first global text divergence point is also marked in the following example text segments:

| Text Segment 1 | Text Segment 2 | Text Segment 3 |
|---|---|---|
| Our ^tale begins on a dark and stormy night many years ago, in an unremarkable house on an unremarkable street in an unremarkable city. | Our ^tale begins on a dark and stormy night many years ago, in an unremarkable house on an unremarkable street in an unremarkable city. | Our ^curious tale begins on a dark and stormy night many years ago, in an unremarkable house on an unremarkable street in an unremarkable city. |

In both of the prior examples, the first global text divergence point occurs immediately after "Our" in each text segment. This is true of both Text Segment 1 and Text Segment 2 in the second example even though neither contain any text that is not global unchanged text. Because Text Segment 3 contains text after "Our" that is not global unchanged text, the corresponding points in Text Segment 1 and Text Segment 2 constitute global text divergence points in these text segments.

When one or more of the text segments begin with text that is not global unchanged text, the first global text divergence point is the beginning position of each text segment. Such is the case with the following example text segments:

| Text Segment 1 | Text Segment 2 | Text Segment 3 |
|---|---|---|
| ^Our story starts on a dark and stormy night many years ago, in an | ^Our story starts on a dark and stormy night many years ago, in an | ^This story starts on a dark and stormy night many years ago, in an |

-continued

| Text Segment 1 | Text Segment 2 | Text Segment 3 |
| --- | --- | --- |
| unremarkable house on an unremarkable street in an unremarkable city. | unremarkable house on an unremarkable street in an unremarkable city. | unremarkable house on an unremarkable street in an unremarkable city. |

FIG. 2 shows that the method 200 can also include determining 216 whether a global text divergence point was identified.

FIG. 2 shows that the method 200 can also include attempting 218 to identify the first-occurring instance of a global text convergence point at or after the global text divergence point in the original text segment and at or after the global text divergence point in the revised text segment. With respect to two or more text segments, a "global text convergence point" means an instance of text that is global unchanged text in each of the text segments.

FIG. 2 shows that the method 200 can also include determining 220 whether a global text convergence point was identified.

FIG. 2 shows that the method 200 can also include comparing 222, and generating pairwise revision markings with respect to, the text, if any, in the original text segment that occurs at or after the global text divergence point and before the global text convergence point and the text, if any, in the revised text segment that occurs at or after the global text divergence point and before the global text convergence point when a global text convergence point was identified.

FIG. 2 shows that the method 200 can also include adjusting 224 the original text global cursor so that it references the position of the global text convergence point in the original text segment.

FIG. 2 shows that the method 200 can also include adjusting 226 the revised text global cursor so that it references the position of the global text convergence point in the revised text segment.

FIG. 2 shows that the method 200 can also include comparing 228, and generating pairwise revision markings with respect to, the text, if any, in the original text segment that occurs at or after the global text divergence point and before the end of the original text segment and the text, if any, in the revised text segment that occurs at or after the global text divergence point and before the end of the revised text segment when no global text convergence point was identified.

The following example is provided for illustrative purposes only and without intent or effect to limit the scope of the invention. It does not purport to illustrate all of the steps (either required or optional) nor every sub-part of, nor every state nor condition applicable to, those steps (either required or optional) illustrated.

Assume the following three text segments:

| Text Segment 1 | Text Segment 2 | Text Segment 3 |
| --- | --- | --- |
| Our story starts on a dark and stormy night many years ago, in an unremarkable house on an unremarkable street in an unremarkable city. | Our tale begins on a dark and stormy night not many years ago, in a nondescript house on an average street in an unremarkable city. | This tale commences on a dark and stormy night not long ago, in a foreboding house on a dreary street in a forgotten city. |

After the global unchanged text is identified 202 and marked 204 (using boldface for purposes of this example), the text segments might now be depicted as follows:

| Text Segment 1 | Text Segment 2 | Text Segment 3 |
| --- | --- | --- |
| Our story starts on a dark and stormy night many years ago, in an unremarkable house on an unremarkable street in an unremarkable city. | Our tale begins on a dark and stormy night not many years ago, in a nondescript house on an average street in an unremarkable city. | This tale commences on a dark and stormy night not long ago, in a foreboding house on a dreary street in a forgotten city. |

Assume that Text Segment 1 is designated 206 as the original text segment and that Text Segment 2 is designated 208 as the revised text segment. At 214, a global text divergence point is identified at the beginning of each text segment. This is true even though Text Segment 1 and Text Segment 2 both begin with "Our." Because Text Segment 3 begins with "This," the beginning of each text segment constitutes a global text divergence point in each.

Because it is determined 216 that a global text divergence point was identified, an attempt 218 is made to identify a subsequently-occurring global text convergence point. The attempt succeeds and a global text convergence point is identified at "on" in each text segment.

The text occurring at or after the beginning of Text Segment 1 and before "on" in Text Segment 1 is compared 222 to the text occurring at or after the beginning of Text Segment 2 and before "on" in Text Segment 2 and pairwise revision markings are generated. The text segments might now be depicted as follows:

| Text Segment 1 | Text Segment 2 | Text Segment 3 |
| --- | --- | --- |
| Our story starts on a dark and stormy night many years ago, in an unremarkable house on an unremarkable street in an unremarkable city. | Our ~~story starts~~ tale begins on a dark and stormy night not many years ago, in a nondescript house on an average street in an unremarkable city. | This tale commences on a dark and stormy night not long ago, in a foreboding house on a dreary street in a forgotten city. |

The original text global cursor is adjusted 224 so that it references the position of "on" in the Text Segment 1. The revised text global cursor is adjusted 226 so that it references the position of "on" in Text Segment 2.

At the next iteration of 214, a global text divergence point is identified at "many" in Text Segment 1 and at "not" in Text Segment 2. Because it is determined 216 that a global text divergence point was identified, an attempt 218 is made to identify a subsequently-occurring global text convergence point. The attempt succeeds and a global text convergence point is identified at "ago" in each text segment.

The text occurring at or after "many" and before "ago" in Text Segment 1 is compared 222 to the text occurring at or after "not" and before "ago" in Text Segment 2 and pairwise revision markings are generated. The text segments might now be depicted as follows:

| Text Segment 1 | Text Segment 2 | Text Segment 3 |
| --- | --- | --- |
| Our story starts on a dark and | Our ~~story starts~~ tale begins on a dark and | This tale commences on a dark and stormy |

| Text Segment 1 | Text Segment 2 | Text Segment 3 |
|---|---|---|
| stormy night many years ago, in an unremarkable house on an unremarkable street in an unremarkable city. | stormy night not *many* *years* ago, in a nondescript house on an average street in an unremarkable city. | night not long ago, in a foreboding house on a dreary street in a forgotten city. |

The original text global cursor is adjusted 224 so that it references the position of "ago" in Text Segment 1. The revised text global cursor is adjusted 226 so that it references the position of "ago" in Text Segment 2.

At the next iteration of 214, a global text divergence point is identified at "an" in Text Segment 1 and at "a" in Text Segment 2. Because it is determined 216 that a global text divergence point was identified, an attempt 218 is made to identify a subsequently-occurring global text convergence point. The attempt succeeds and a global text convergence point is identified at "house" in each text segment.

The text occurring at or after "an" and before "house" in Text Segment 1 is compared 222 to the text occurring at or after "a" and before "house" in Text Segment 2 and pairwise revision markings are generated. The text segments might now be depicted as follows:

| Text Segment 1 | Text Segment 2 | Text Segment 3 |
|---|---|---|
| Our story starts on a dark and stormy night many years ago, in an unremarkable house on an unremarkable street in an unremarkable city. | *Our* ~~story starts~~ tale begins on a dark and stormy night not *many* *years* ago, in ~~an~~ ~~unremarkable~~ a nondescript house on an average street in an unremarkable city. | This tale commences on a dark and stormy night not long ago, in a foreboding house on a dreary street in a forgotten city. |

The original text global cursor is adjusted 224 so that it references the position of "house" in Text Segment 1. The revised text global cursor is adjusted 226 so that it references the position of "house" in Text Segment 2.

At the next iteration of 214, a global text divergence point is identified at "an" in both Text Segment 1 and Text Segment 2. Because it is determined 216 that a global text divergence point was identified, an attempt 218 is made to identify a subsequently-occurring global text convergence point. The attempt succeeds and a global text convergence point is identified at "street" in each text segment.

The text occurring at or after "an" and before "street" in Text Segment 1 is compared 222 to the text occurring at or after "an" and before "street" in Text Segment 2 and pairwise revision markings are generated. The text segments might now be depicted as follows:

| Text Segment 1 | Text Segment 2 | Text Segment 3 |
|---|---|---|
| Our story starts on a dark and stormy night many years ago, in an unremarkable house on an unremarkable street in an unremarkable city. | *Our* ~~story starts~~ tale begins on a dark and stormy night not *many* *years* ago, in ~~an~~ ~~unremarkable~~ a nondescript house on an average ~~unremarkable~~ street in an unremarkable city. | This tale commences on a dark and stormy night not long ago, in a foreboding house on a dreary street in a forgotten city. |

The original text global cursor is adjusted 224 so that it references the position of "street" in Text Segment 1. The revised text global cursor is adjusted 226 so that it references the position of "street" in Text Segment 2.

At the next iteration of 214, a global text divergence point is identified at "an" in both Text Segment 1 and Text Segment 2. Because it is determined 216 that a global text divergence point was identified, an attempt 218 is made to identify a subsequently-occurring global text convergence point. The attempt succeeds and a global text convergence point is identified at "city" in each text segment.

The text occurring at or after "an" and before "city" in Text Segment 1 is compared 222 to the text occurring at or after "an" and before "city" in Text Segment 2 and pairwise revision markings are generated. The text segments might now be depicted as follows:

| Text Segment 1 | Text Segment 2 | Text Segment 3 |
|---|---|---|
| Our story starts on a dark and stormy night many years ago, in an unremarkable house on an unremarkable street in an unremarkable city. | *Our* ~~story starts~~ tale begins on a dark and stormy night not *many* *years* ago, in ~~an~~ ~~unremarkable~~ a nondescript house on *an* ~~unremarkable~~ average street in *an unremarkable* city. | This tale commences on a dark and stormy night not long ago, in a foreboding house on a dreary street in a forgotten city. |

The original text global cursor is adjusted 224 so that it references the position of "city" in Text Segment 1. The revised text global cursor is adjusted 226 so that it references the position of "city" in Text Segment 2.

At the next iteration of 214, the attempt to identify a global text divergence point fails. Because it is determined 216 that no global text divergence point was identified, further processing thereafter ceases.

Figure 3:
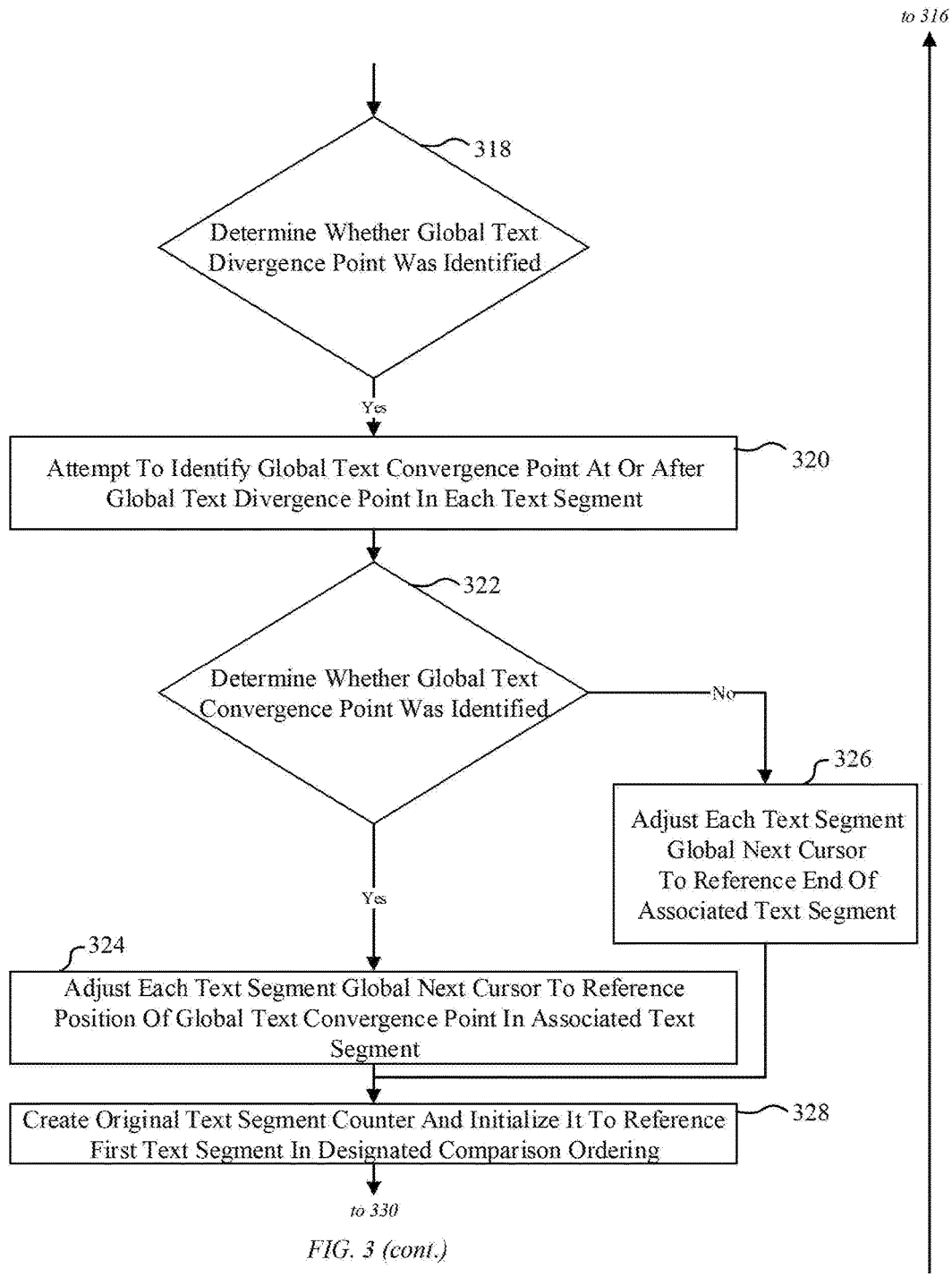
FIG. 3 is a flowchart illustrating a method of comparing, and generating revision markings with respect to, two or more text segments using a comparison ordering.
Figure 3:
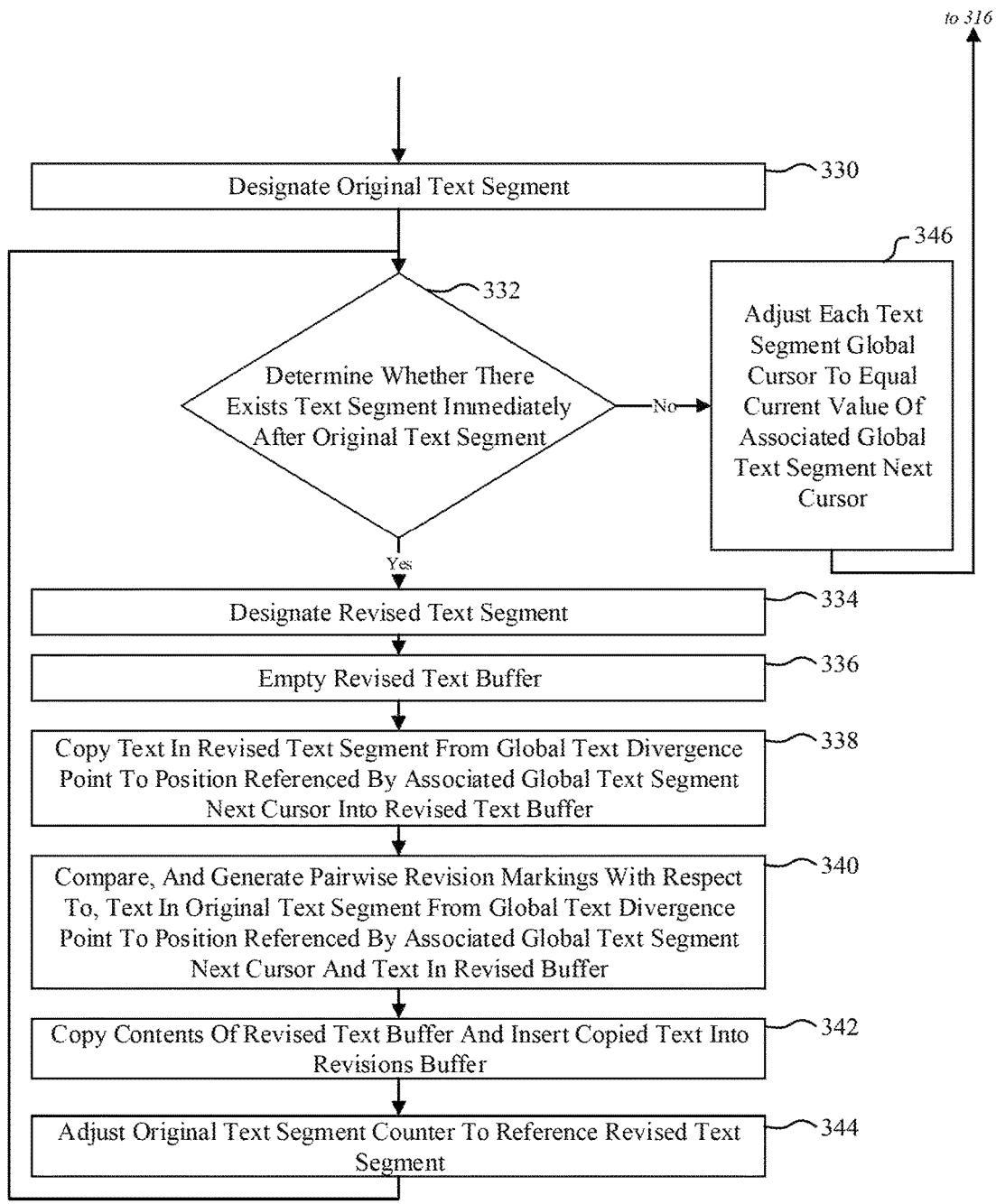

FIG. 3 is a flowchart illustrating a method 300 of comparing, and generating revision markings with respect to, two or more text segments using a comparison ordering.

FIG. 3 shows that the method 300 can include identifying 302 global unchanged text among the text segments.

FIG. 3 shows that the method 300 can also include marking 304 the global unchanged text in one or more of the text segments with a distinct visual style that signifies its status as such.

FIG. 3 shows that the method 300 can also include designating 306 a comparison ordering among the text segments. A "comparison ordering" means a sequence in which the text segments will be subject to additional, pairwise comparisons. A comparison ordering can include a sequence of multiple drafts of the same text segment (e.g., first draft, second draft, third draft, etc.)

FIG. 3 shows that the method 300 can include creating 308 a text pointer (each a "text segment global cursor") associated with each text segment and initializing each to reference the beginning of the text segment that the text segment global cursor is associated with. The term "associated with" means any form or combination of computer storage by which one or more pieces of data may be associated with any one or more other pieces of data.

FIG. 3 shows that the method 300 can also include creating 310 a text pointer (each a "text segment global next cursor") associated with each text segment.

FIG. 3 shows that the method 300 can also include creating 312 a buffer (the "revisions buffer"). A "buffer" means any form or combination of computer storage capable of storing text.

FIG. 3 shows that the method 300 can also include creating 314 a buffer (the "revised text buffer").

FIG. 3 shows that the method 300 can also include attempting 316 to identify the first-occurring instance of a global text divergence point at or after the position in each text segment referenced by the current value of the text segment global cursor associated with the text segment.

FIG. 3 shows that the method 300 can also include determining 318 whether a global text divergence point was identified.

FIG. 3 shows that the method 300 can also include attempting 320 to identify the first-occurring instance of a global text convergence point at or after the global text divergence point in each text segment when a global text divergence point was identified.

FIG. 3 shows that the method 300 can also include determining 322 whether a global text convergence point was identified.

FIG. 3 shows that the method 300 can also include adjusting 324 each text segment global next cursor to reference the position of the global text convergence point in the text segment that the text segment global next cursor is associated with when a global text convergence point was identified.

FIG. 3 shows that the method 300 can also include adjusting 326 each text segment global next cursor to reference the end of the text segment that the text segment global next cursor is associated with when no global text convergence point was identified.

FIG. 3 shows that the method 300 can also include creating 328 a text segment counter (the "original text segment counter") and initializing it to reference the first text segment among the text segments according to the designated comparison ordering. A "text segment counter" means any form or combination of computer storage capable of storing a reference to a particular text segment within a group of text segments. Such a text segment counter may be initialized so that it references a particular text segment within the group of text segments and may thereafter be adjusted so that it references a different text segment within the group of text segments. To "reference" a text segment means to uniquely and specifically identify a particular text segment within a group of text segments (which can include use of a count, offset value or pointer).

FIG. 3 shows that the method 300 can also include designating 330 the text segment referenced by the current value of the original text segment counter as the original text segment.

FIG. 3 shows that the method 300 can also include determining 332 whether a text segment exists that is immediately after the original text segment according to the designated comparison ordering.

FIG. 3 shows that the method 300 can also include designating 334 the text segment that is immediately after the original text segment according to the designated comparison ordering as the revised text segment when a text segment exists that is immediately after the original text segment according to the designated comparison ordering.

FIG. 3 shows that the method 300 can also include emptying 336 the revised text buffer.

FIG. 3 shows that the method 300 can also include copying 338 the text, if any, that occurs in the revised text segment at or after the global text divergence point and before the position referenced by the current value of the global text segment next cursor associated with the revised text segment into the revised text buffer. To copy text "into" a particular location means to store an identical copy of the text at the location.

FIG. 3 shows that the method 300 can also include comparing 340, and generating pairwise revision markings with respect to, the text, if any, in the original text segment that occurs at or after the global text divergence point and before the position referenced by the current value of the global text segment next cursor associated with the original text segment and the text contained in the revised text buffer.

FIG. 3 shows that the method 300 can also include copying 342 the contents of the revised text buffer into the revisions buffer.

FIG. 3 shows that the method 300 can also include adjusting 344 the original text segment counter so that it references the revised text segment.

FIG. 3 shows that the method 300 can also include adjusting 346 each text segment global cursor so that its value is equal to the current value of the global text segment next cursor that is associated with the same text segment when no text segment exists that is immediately after the original text segment according to the designated comparison ordering.

The following example is provided for illustrative purposes only and without intent or effect to limit the scope of the invention. It does not purport to illustrate all of the steps (either required or optional) nor every sub-part of, nor every state nor condition applicable to, those steps (either required or optional) illustrated.

Assume the following four text segments:

| Text Segment 1 | Text Segment 2 | Text Segment 3 | Text Segment 4 |
| --- | --- | --- | --- |
| Our story starts on a dark and stormy night many years ago, in an unremarkable house on an unremarkable street in an unremarkable city. | Our tale begins on a dark and stormy night not many years ago, in a nondescript house on an average street in an unremarkable city. | This tale commences on a dark and stormy night not long ago, in a foreboding house on a dreary street in a forgotten city. | This lamentable tale opens on a dark and stormy night, not so long ago, in a large, foreboding house on a sinister street in a now almost forgotten city. |

After the global unchanged has been identified 302 and marked 304 (using boldface for purposes of this example), the text segments might now be depicted as follows:

| Text Segment 1 | Text Segment 2 | Text Segment 3 | Text Segment 4 |
| --- | --- | --- | --- |
| Our story starts on a dark and stormy night many years ago, in an unremarkable house on an unremarkable street in an unremarkable city. | Our tale begins on a dark and stormy night not many years ago, in a nondescript house on an average street in an unremarkable city. | This tale commences on a dark and stormy night not long ago, in a foreboding house on a dreary street in a forgotten city. | This lamentable tale opens on a dark and stormy night not so long ago, in a large, foreboding house on a sinister street in a now almost forgotten city. |

Assume that a comparison ordering is designated 306 as follows: Text Segment 1, Text Segment 2, Text Segment 3, Text Segment 4. After a text segment global cursor is created 308 and initialized for each text segment, a text segment global next cursor is created 310 for each text segment, a revisions buffer is created 312 and a revised text buffer is created 314, an attempt 316 is made to identify a global text divergence point. The attempt succeeds and a global text divergence point is identified at the beginning of each text segment.

Because it is determined 318 that a global text divergence point was identified, an attempt 320 is made to identify a global text convergence point at or after the beginning of each text segment. The attempt succeeds and a global text convergence point is identified at "on" in each text segment. Because it is determined 322 that a global text convergence point was identified, each global text segment next cursor is adjusted 324 to reference the position of "on" in the text segment that the global text segment next cursor is associated with.

An original text segment counter is created 328 and initialized to reference Text Segment 1, which is designated 330 as the original text segment. Because it is determined 332 that a text segment (i.e. Text Segment 2) exists that is immediately after Text Segment 1 in the designated comparison ordering, Text Segment 2 is designated 334 as the revised text segment. The revised text buffer is emptied 336 and the text that occurs in Text Segment 2 at or after the beginning of Text Segment 2 and before "on" is copied 338 into the revised text buffer. After the text that occurs in Text Segment 1 at or after the beginning of Text Segment 1 and before "on" is compared 340 to, and pairwise revision markings are generated with respect to, the text contained in the revised text buffer, the revised text buffer might now be depicted as follows:

| |
| --- |
| *Our* ~~story starts~~ tale begins |

After the contents of the revised text buffer are copied 342 into the revisions buffer, the revisions buffer might now be depicted as follows:

| |
| --- |
| *Our* ~~story starts~~ tale begins |

The original text segment counter is adjusted 344 to reference Text Segment 2.

At the next iteration 330, Text Segment 2 is designated 330 as the original text segment. Because it is determined 332 that a text segment (i.e. Text Segment 3) exists that is immediately after Text Segment 2 in the designated comparison ordering, Text Segment 3 is designated 334 as the revised text segment. The revised text buffer is emptied 336 and the text that occurs in Text Segment 3 at or after the beginning of Text Segment 3 and before "on" is copied 338 into the revised text buffer. After the text that occurs in Text Segment 2 at or after the beginning of Text Segment 2 and before "on" is compared 340 to, and pairwise revision markings are generated with respect to, the text contained in the revised text buffer, the revised text buffer might now be depicted as follows:

| |
| --- |
| ~~Our~~ This *tale* ~~begins~~ commences |

After the contents of the revised text buffer are copied 342 into the revisions buffer, the revisions buffer might now be depicted as follows:

| | |
| --- | --- |
| *Our* ~~story starts~~ tale begins | ~~Our~~ This *tale* ~~begins~~ commences |

The original text segment counter is adjusted 344 to reference Text Segment 3.

At the next iteration 330, Text Segment 3 is designated 330 as the original text segment. Because it is determined 332 that a text segment (i.e. Text Segment 4) exists that is immediately after Text Segment 3 in the designated comparison ordering, Text Segment 4 is designated 334 as the revised text segment. The revised text buffer is emptied 336 and the text that occurs in Text Segment 4 at or after the beginning of Text Segment 4 and before "on" is copied 338 into the revised text buffer. After the text that occurs in Text Segment 3 at or after the beginning of Text Segment 3 and before "on" is compared 340 to, and pairwise revision markings are generated with respect to, the text contained in the revised text buffer, the revised text buffer might now be depicted as follows:

| |
| --- |
| *This* lamentable *tale* ~~commences~~ opens |

After the contents of the revised text buffer are copied 342 into the revisions buffer, the revisions buffer might now be depicted as follows:

| | | |
| --- | --- | --- |
| *Our* ~~story starts~~ tale begins | ~~Our~~ This *tale* ~~begins~~ commences | *This* lamentable *tale* ~~commences~~ opens |

The original text segment counter is adjusted 344 to reference Text Segment 4.

At the next iteration 330, Text Segment 4 is designated 330 as the original text segment. Because it is determined 332 that no text segment exists that is immediately after Text Segment 4 in the designated comparison ordering, each text segment global cursor is adjusted 346 to reference the position of "on" in the text segment that the text segment global cursor is associated with.

Additional iterations of 316-346 then occur but are not depicted for purposes of this example.

Figure 4:
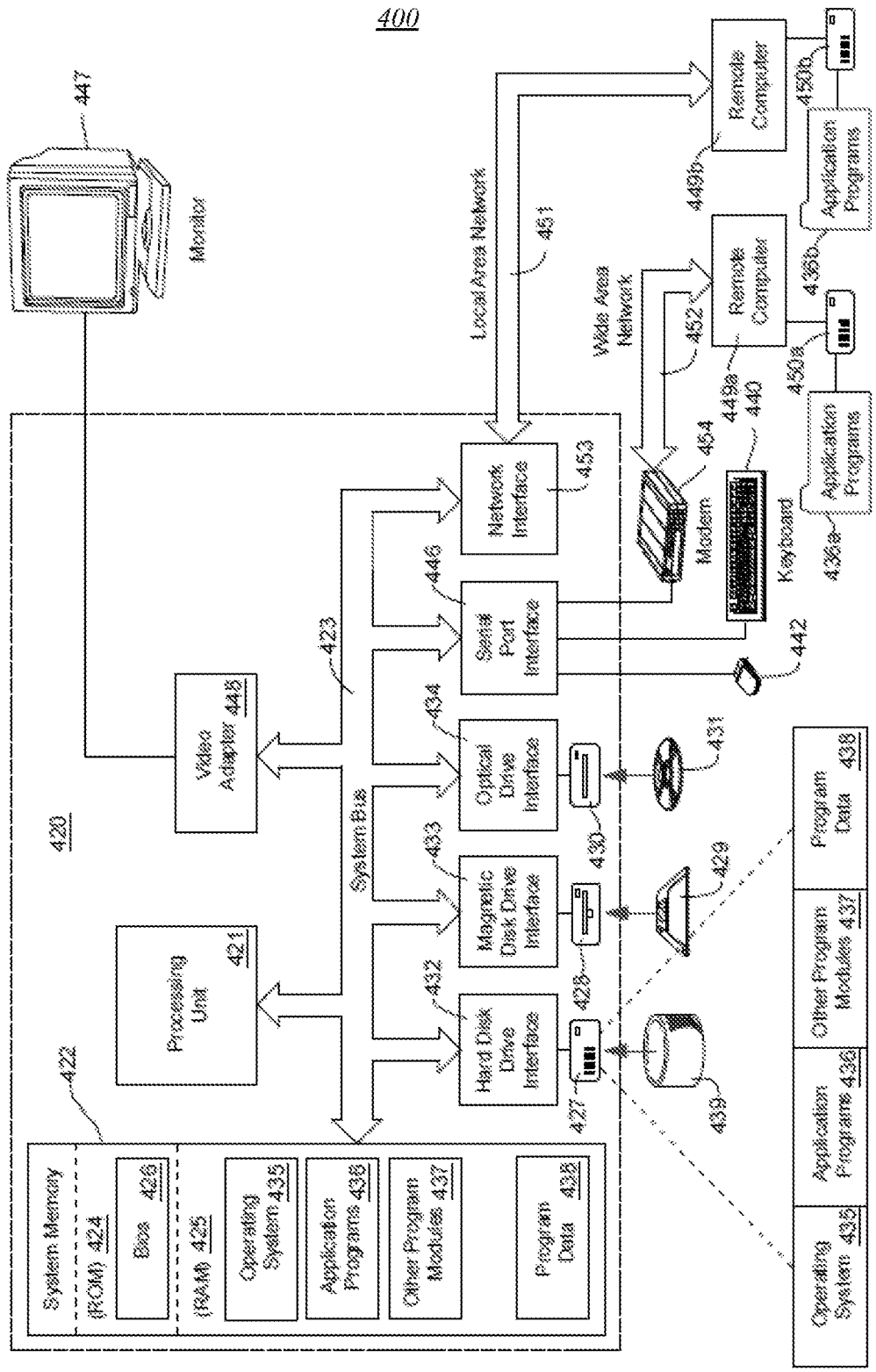
FIG. 4 illustrates an example of a suitable computing environment in which the invention may be implemented.

FIG. 4, and the following discussion, are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One of skill in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an example system for implementing the invention includes a general purpose computing device in the form of a conventional computer 420, including a processing unit 421, a system memory 422, and a system bus 423 that couples various system components including the system memory 422 to the processing unit 421. It should be noted however, that as mobile phones become more sophisticated, mobile phones are beginning to incorporate many of the components illustrated for conventional computer 420. Accordingly, with relatively minor adjustments, mostly with respect to input/output devices, the description of conventional computer 420 applies equally to mobile phones. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, motion detectors or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449*a* and 449*b*. Remote computers 449*a* and 449*b* may each be another personal computer, a server, a router, a network PC, a peer device or other common network node, and typically include many or all of the elements described above relative to the computer 420, although only memory storage devices 450*a* and 450*b* and their associated application programs 436*a* and 436*b* have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 can be connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for comparing, and generating pairwise revision markings with respect to, an original text segment and a revised text segment, the system comprising:

one or more hardware processors;

system memory coupled to the one or more hardware processors, the system memory storing instructions that are executable by the one or more hardware processors;

the one or more hardware processors executing the instructions stored in the system memory to compare, and generate pairwise revision markings with respect to, an original text segment and a revised text segment, including the following:

identifying pairwise unchanged text between the original text segment and the revised text segment;

marking the pairwise unchanged text with a distinct visual style;

creating an original text pairwise cursor and initializing a to reference the beginning of the original text segment;

creating a revised text pairwise cursor and initializing a to reference the beginning of the revised text segment;

attempting to identify the first-occurring instance of a pairwise text divergence point at or after the position in the original text segment referenced by the current value of the original text pairwise cursor and at or after the position in the revised text segment referenced by the current value of the revised text pairwise cursor;

when a pairwise text divergence point is identified:

attempting to identify the first-occurring instance of a pairwise text convergence point at or after the pairwise text divergence point in the original text segment and at or after the pairwise text divergence point in the revised text segment;

when a pairwise text convergence point is identified:

copying the text, if any, that occurs in the original text segment at or after the pairwise text divergence point and before the pairwise text convergence point, inserting the copied text into the revised text segment at the position that is immediately before the pairwise text divergence point in the revised text segment and marking the copied text with a distinct visual style;

marking the text, if any, that occurs in the revised text segment at or after the pairwise text divergence point and before the pairwise text convergence point with a distinct visual style;

adjusting the original text pairwise cursor so that it references the position of the pairwise text convergence point in the original text segment;

adjusting the revised text pairwise cursor so that it references the position of the pairwise text convergence point in the revised text segment;

when no pairwise text convergence point is identified:

copying the text, if any, that occurs in the original text segment at or after the pairwise text divergence point and before the end of the original text segment, inserting the copied text, if any, into the revised text segment at the position that is immediately before the pairwise text divergence point in the revised text segment and marking the copied text, if any, with a distinct visual style; and marking the text, if any, that occurs in the revised text segment at or after the pairwise text divergence point and before the end of the revised text segment with a distinct visual style.

2. The use of the system of claim 1 to compare, and generating pairwise revision markings with respect to, text that occurs in two or more text segments at or after a global text divergence point and before a global text convergence point.

3. The use of the system of claim 1 to compare, and generating pairwise revision markings with respect to, text that occurs in two or more text segments at or after a global text divergence point and before the end of each text segment.

* * * * *